United States Patent
Ahnesjo et al.

(10) Patent No.: US 8,053,736 B2
(45) Date of Patent: Nov. 8, 2011

(54) DETECTOR RESPONSE MODELING

(75) Inventors: Anders Ahnesjo, Uppsala (SE); Karin Eklund, Uppsala (SE); Goran Rikner, Uppsala (SE); Camilla Ronnqvist, Uppsala (SE); Erik Grusell, Uppsala (SE)

(73) Assignee: IBA S.A., Louvain-la-Neuve (BE)

( * ) Notice: Subject to any disclaimer, the term of this patent is extended or adjusted under 35 U.S.C. 154(b) by 460 days.

(21) Appl. No.: 12/299,526

(22) PCT Filed: Apr. 27, 2007

(86) PCT No.: PCT/EP2007/054184
§ 371 (c)(1),
(2), (4) Date: Nov. 4, 2008

(87) PCT Pub. No.: WO2007/128718
PCT Pub. Date: Nov. 15, 2007

(65) Prior Publication Data
US 2009/0090870 A1   Apr. 9, 2009

(30) Foreign Application Priority Data

May 4, 2006 (SE) ........................ 0600995

(51) Int. Cl.
*G01T 1/02* (2006.01)
(52) U.S. Cl. .................................. 250/370.07
(58) Field of Classification Search .............. 250/370.07
See application file for complete search history.

(56) References Cited

U.S. PATENT DOCUMENTS

| | | | |
|---|---|---|---|
| 2006/0203964 A1* | 9/2006 | Nyholm et al. | 378/65 |
| 2008/0049898 A1* | 2/2008 | Romesberg et al. | 378/65 |
| 2010/0119139 A1* | 5/2010 | Bertram et al. | 382/131 |

OTHER PUBLICATIONS

Russell et al., "Implementation of pencil kernel and depth penetration algorithms for treatment planning of proton beams," Jun. 3, 1999, Phys. Med. Biol., vol. 45, pp. 9-27.*
Ostapiak O. Z. et al., "Refinements of the finite-size pencil beam model of three-dimensional photon dose calculation", Medical Physics AIP for American Assoc. Phys. Med USA, vol. 24, No. 5, May 1997, pp. 743-750.
International Search Reported dated Sep. 28, 2007, filed in PCT application.
Anders Ahnesjö et al., "Dose calculations for external photon beams in radiotherapy", Phys. Med. Biol., 1999, vol. 44, pp. 99-155, IOP Publishing Ltd.
Z Yin et al., "Response corrections for solid-state detectors in megavoltage photon dosimetry", Phys. Med. Biol., vol. 49, 2004, pp. 3691-3702, Institute of Physics Publishing, United Kingdom. F H Attix, "Introduction to Radiological Physics and Radiation Dosimetry", Wiley, 1986, pp. 231-263, New York, USA.
Iaea, "Absorbed Dose Determination in External Beam Radiotherapy: An International Code of Practice for Dosimetry based on Standards of Absorbed Dose to Water", TRS-398, 2001, pp. 59-71.

* cited by examiner

*Primary Examiner* — David Porta
*Assistant Examiner* — Christine Sung
(74) *Attorney, Agent, or Firm* — Young & Thompson (57) ABSTRACT

A detector response correction arrangement and method is proposed for online determination of correction factors for arbitrary positions from arbitrary incident fluence distributions. As modern radiotherapy utilizes more of the available degrees of freedom of radiation machines, dosimetry has to be able to present reliable measurements for all these degrees of freedom. To determine correction factors online during measurement, Monte Carlo technique is used to precalculate fluence pencil kernels from a monodirectional beam to fully describe the particle fluence in an irradiated medium. Assuming that the particle fluence is not significantly altered by the introduction of a small detector volume, the fluence pencil kernels (212) can be integrated (214), and correction factors (216) determined, e.g. by Cavity Theory, in different positions for the detector material.

21 Claims, 5 Drawing Sheets

DETECTOR RESPONSE MODELING

TECHNICAL FIELD

The present invention relates in general to radiation dosimetry and in particular to methods and devices for radiation detector response correction.

BACKGROUND

Exposure for ionizing radiation is used in many technical fields, both therapeutical and non-therapeutical, e.g. for sterilizing purposes, radiotherapy, material modification etc. Common for most applications is that there is a need for dosimetry. Dosimetry deals with the process of determining the absorbed dose to an irradiated medium. Such a determining is generally applicable for all kinds of applications and therefore not a part of any treatment or diagnosing of a human being.

In radiotherapy, patients are treated for cancer with beams of ionizing radiation. The aim is to sterilize the tumor cells while spearing the healthy tissue surrounding them as far as possible. It is imperative that the planning, delivery and quality assurance through measurements of the absorbed dose, is done with high accuracy as to ensure precisely tailored treatments. There are different modalities of radiations used, such as conventional photon beams, intensity modulated photons (IMRT), electrons, protons or light ions.

In the document "Refinements of the finite-size pencil beam model of three-dimensional photon dose calculation" by O. Z. Ostapiak et al in Med. Phys. 24(5), May 1997, pp. 743-750, photon dose calculation algorithms are presented. The dose calculation is based on a convolution of the photon fluence and a radiation dose kernel ("dose spread kernel"). Such dose calculations are frequently used for clinical dose planning, but are not possible to utilize in connection with quality assurance problems. The present invention instead relates solely to the quality assurance problem, and does not concern any treatment planning of radiation.

A variety of detectors can be used, e.g. ionization chambers, calorimeters, solid state detectors, diodes, film, or thermoluminescence detectors (TLD), for different applications such as in vitro dosimetry or in vivo dosimetry. In vitro dosimetry relates to quality assurance of the irradiation using phantoms of water or tissue equivalent plastics. In in vitro dosimetry, detectors are placed in contact with a patient.

As mentioned above, dosimetry deals with the process of determining the absorbed dose to an irradiated medium. However, the introduction of a measurement device itself, i.e. a dosimeter, will introduce changes in the radiation conditions. It is not trivial to obtain the actual absorbed dose in an irradiated object from the reading from a measurement device. Placing a detector in, or on the surface of, an object to be irradiated the reading will give a different value than what is the actual dose deposition in equivalent volumes in the irradiated object. Knowing the proportion between deposited dose in different materials at different positions enables the determination of the dose to the object. In dosimetry, correction factors are used to express such relations.

In prior art radiation devices, correction factors are typically determined experimentally in water phantoms along the central axis of the radiation field, and tabulated as correction factors for different depths for standard field sizes. An alternative approach is to calculate correction factors, e.g. through extensive and lengthy Monte Carlo simulations of the radiation transport and interactions as to determine the full spectral distribution of particles incident on the detector.

In modern radiotherapy, one modulates and shape the beam as to adjust the delivered dose to the tumor in order to spare the healthy tissue surrounding it to the outermost extent. Similar needs for customizing the irradiation field are present also in other applications. Modulating the irradiation field is done with different techniques, e.g. by dividing the treatment irradiation into partitions delivered with different amounts and field shapes, from different incident angles. Shaping the field, and their partitions, can be done either with adjustable collimator leaves, specific molded collimators or by scanning a narrow beam.

SUMMARY

A general problem with prior art devices and methods for providing response correction factors is that they are extremely time consuming and expertise demanding in operation. Response correction factors for an arbitrary field shape, fluence modulation and position in the irradiated object can therefore not be provided with satisfactory accuracy within a reasonable short time, simplicity and reliability for online corrections. Predetermined response correction factors can be provided for some situations, but only for standard radiation field shapes and positions.

A general object of the present invention is to provide reliable methods and devices for online radiation detector response correction applicable for an arbitrary radiation field shape, fluence modulation and position in the irradiated object. A further object of the present invention is to use the method also for online corrections of dosimeters used for "in vivo" dosimetry.

The objects mentioned above are achieved by methods and devices according to the enclosed patent claims. In general words, a method and a device embedding an algorithm to calculate correction factors online during measurements, for an arbitrary position in the irradiated object and for arbitrary field shapes and fluence modulation, is presented. The approach to determine the correction factors is to store kernels with precalculated fluence spectra for relevant radiation qualities. The precalculated fluence pencil kernels describe fluence response spectra for a point in a medium irradiated by a point monodirectional beam of a specific energy in a surrounding of the beam, given per incident amount of radiation. During a measurement, the corresponding spectrum of particles at the detector position, can be calculated by integrating the kernel to completely describe the particle and energy fluence for the specific field shape and fluence modulation used. A total fluence spectra is achieved, which comprises fluence spectra for primary radiation as well as fluence spectra for scattered radiation. Thereby, the dose at any position can be determined, in the irradiated medium as well as in a detector volume. Hence the correction factor to apply to the detector signal value for determining the absorbed dose to the irradiated object can be calculated, based on a local total fluence spectra at a point and a medium of the detector or radiation dosimeter. The technique is general and can be applied for all ionizing radiation and for all radiation applications.

One advantage with the present invention is that it enables reliable online radiation detector response correction for any arbitrary radiation field and for a variety of different detectors, radiation sources and radiation energies.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
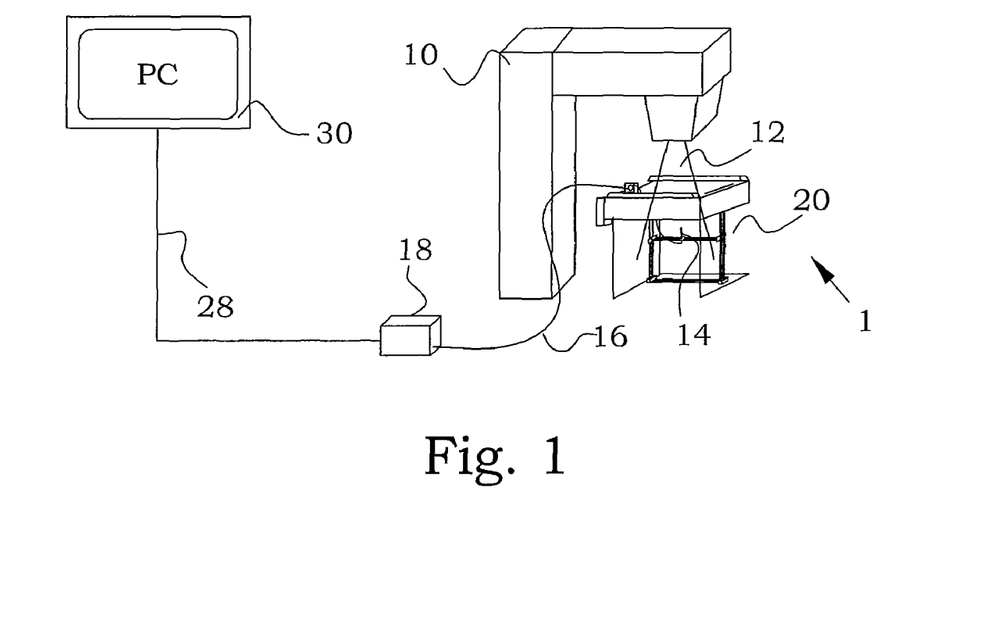
FIG. 1 is a schematic illustration of a general irradiation device performing in vitro measurements.

A general radiation treatment unit 1 as can be found in prior art is illustrated in FIG. 1. In a general irradiation situation ionizing radiation 12 is produced by a radiation source 10 and modulated in a gantry with collimators. The gantry is arranged for exposing an object 20 or media as well as a radiation dosimeter 14 to ionizing radiation 12. The radiation source 10 can be of different kinds, e.g. a photon radiation source, an electron radiation source, a proton radiation source or a light ion radiation source. The radiation dosimeter 14, i.e. the radiation measurement device, is placed within the media 20 to be irradiated, in FIG. 1 a water phantom. The radiation dosimeter 14 can be of different kinds, e.g. an ionization chamber, a solid state detector, a diode, a photographic film or a thermoluminescence detector. The system illustrated in the particular embodiment of FIG. 1 is intended to comprise an electron radiation source and a diode dosimeter. Photographic film and thermoluminescence detectors typically require offline post processing, whereby the system is adapted accordingly. A measurement signal 16 is read out by an electrometer 18 and data 28 representing the measured signal is processed with tabulated correction factors in a computer unit 30.

Differences in absorbed dose to a detector volume and the medium in which the absorbed dose is to be measured (e.g. water) raise the need of means to correct the detector response to achieve an equivalent dose. The differences stems from variations in the ionization response to the particle fluence spectrum in the irradiated volume due to the different material properties. The difference will vary with on the beam quality, the field shape and fluence modulation, and the position in the medium relative the volume/radiation field. Today these differences are determined experimentally in water phantoms along the central axis of the radiation field, and tabulated as correction factors for different depths for standard field sizes or calculated through extensive Monte Carlo simulations.

Modern radiotherapy, as in IMRT, utilizes more of the available degrees of freedom of the radiation machines so that, the concept of "standard fields" is becoming obsolete. To completely profit from this flexibility, and be able to check an exposure with improved accuracy, a better understanding of the therapy field with online modeling of the full fluence environment that determines the relevant correction factors is demanded for maintaining accurate dosimetry. The algorithm according to the preferred embodiments of the present invention models the fluence spectrum in the entire volume and thereby is it possible to model detector specific correction factors necessary to determine the dose through measurements in an arbitrary position by means of Cavity theory.

Figure 2:
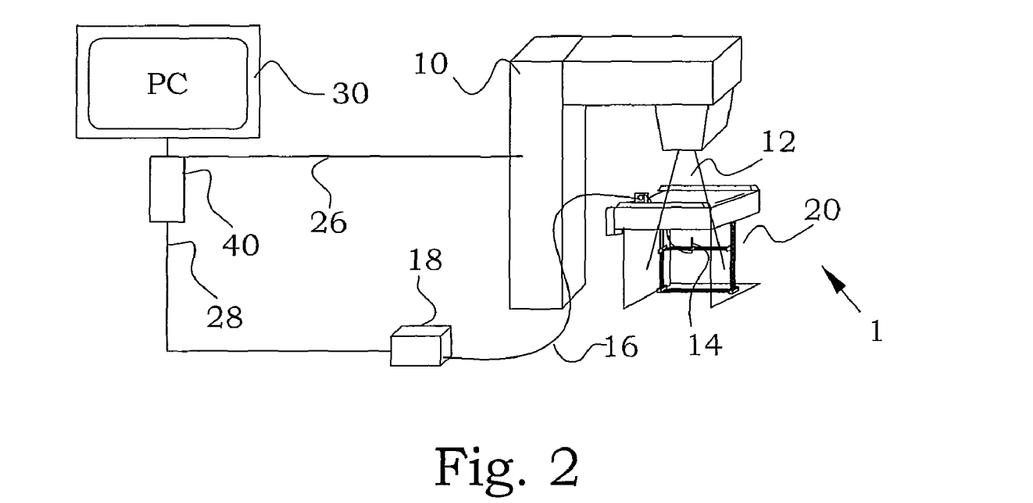
FIG. 2 is a schematic illustration of main parts of an embodiment of an irradiation device according to the present invention.

In FIG. 2, an irradiation device according to the present invention is illustrated. Besides the components illustrated in FIG. 1, the irradiation device according to the present invention also comprises an arrangement for detector response correction 40 connected to the radiation dosimeter 14 readout instead of using tabulated correction factors. Information 26 about the radiation field from the irradiating device 10 is also provided to the arrangement for detector response correction 40.

Figure 3:
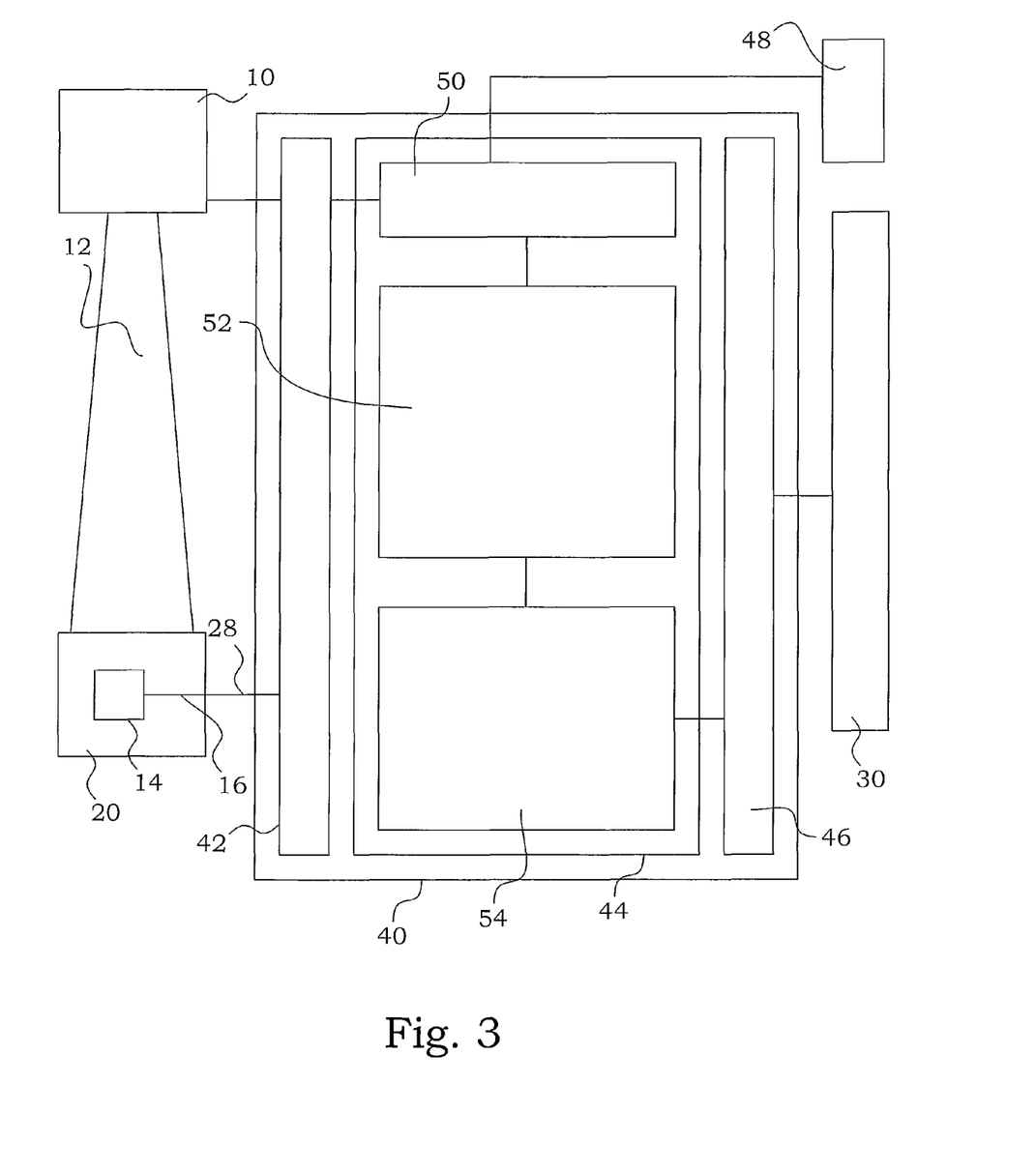
FIG. 3 is block diagram of main parts of an embodiment of a detector response correction arrangement according to the present invention.

One embodiment of a detector response correction arrangement 40 according to the present innovation is outlined in a block diagram in FIG. 3. The arrangement 40 comprises an input means 42 for obtaining a signal or data 28 representing an absorbed dose from a radiation dosimeter 14. Typically, a signal 16 from the radiation dosimeter 14 is obtained with an electrometer, which passes a data signal to the input means 42. In alternative embodiments, the electrometer or any corresponding equipment may be comprised in the input means 42 of the arrangement for detector response correction 40, in which case a measurement signal 16 can be accepted directly from the radiation dosimeter 14. In another alternative embodiment, the input means 42 may comprise a disc drive, in which a data storage medium with stored radiation dosimeter 14 data is introduced. Information about the fluence of the ionizing radiation incident onto the irradiated object is also received by the input means 42, e.g. by a connection to the radiation source 10. However, such information may also be provided to the arrangement for detector response correction 40 manually, whereby the input means 42 then comprises e.g. a keyboard.

A processor 44 is connected to the input means. The processor 44 calculates a correction factor for the field shape, fluence modulation, position in the irradiated object, irradiated medium composition and detector material used during the exposure. The correction factors are applied onto the measured absorbed dose signal 16 and a corrected equivalent absorbed dose is presented by an output means 46. The equivalent absorbed dose is the dose that would have been absorbed if the radiation dosimeter would have been made by the same medium as the surroundings of the radiation dosimeter. The output means in the present embodiment is constituted by an output interface to a monitor screen 30 or any other presentation means. In alternative embodiments, the monitor screen 30 or any corresponding equipment may be comprised in the output means 46 of the arrangement for detector response correction 40. In another alternative embodiment, the output means 46 may comprise e.g. a disc drive, by which a data storage medium may store data concerning corrected equivalent dose for later presentation at an external monitor.

The arrangement for detector response correction 40 further comprises a data storage 48 arranged for storing precalculated fluence pencil kernels. The precalculated fluence pencil kernels describe fluence response spectra for a point in a medium irradiated by a point monodirectional beam of a specific energy in a surrounding of he beam, per incident amount of radiation. The data storage 48 is connected to the processor means 44 in such a way that the processor means 44 is allowed to retrieve the precalculated fluence pencil kernels. The processor 44 comprises an integrating section 50 for integrating the retrieved precalculated fluence pencil kernels over an incident fluence of the ionizing radiation to yield a total fluence spectra (primary and scattered parts) at the point of interest (the detector position). In other words the total fluence spectra comprises fluence spectra for primary radiation as well as fluence spectra for scattered radiation. The processor 44 further comprises a factor determination section 52 arranged for determining a correction factor for the radiation dosimeter 14 based on the total fluence spectra and a medium of the radiation dosimeter 14. The processor 44 also comprises a correction section 54, connected to the input means 42 and the factor determination section 52. Here, the measured absorbed dose as obtained by the input means 42 is corrected in to the requested equivalent absorbed dose, to be output via the output means 46.

In the embodiment described above, arrangement for detector response correction 40 is illustrated as one unit. However, the arrangement can also be considered as a functional unit, whereby hardware involved in the arrangement may be integrated with other units in the system. Also the processor 44, which in the embodiment above is described as one common processor may also be implemented in several communicating physical units.

Figure 4:
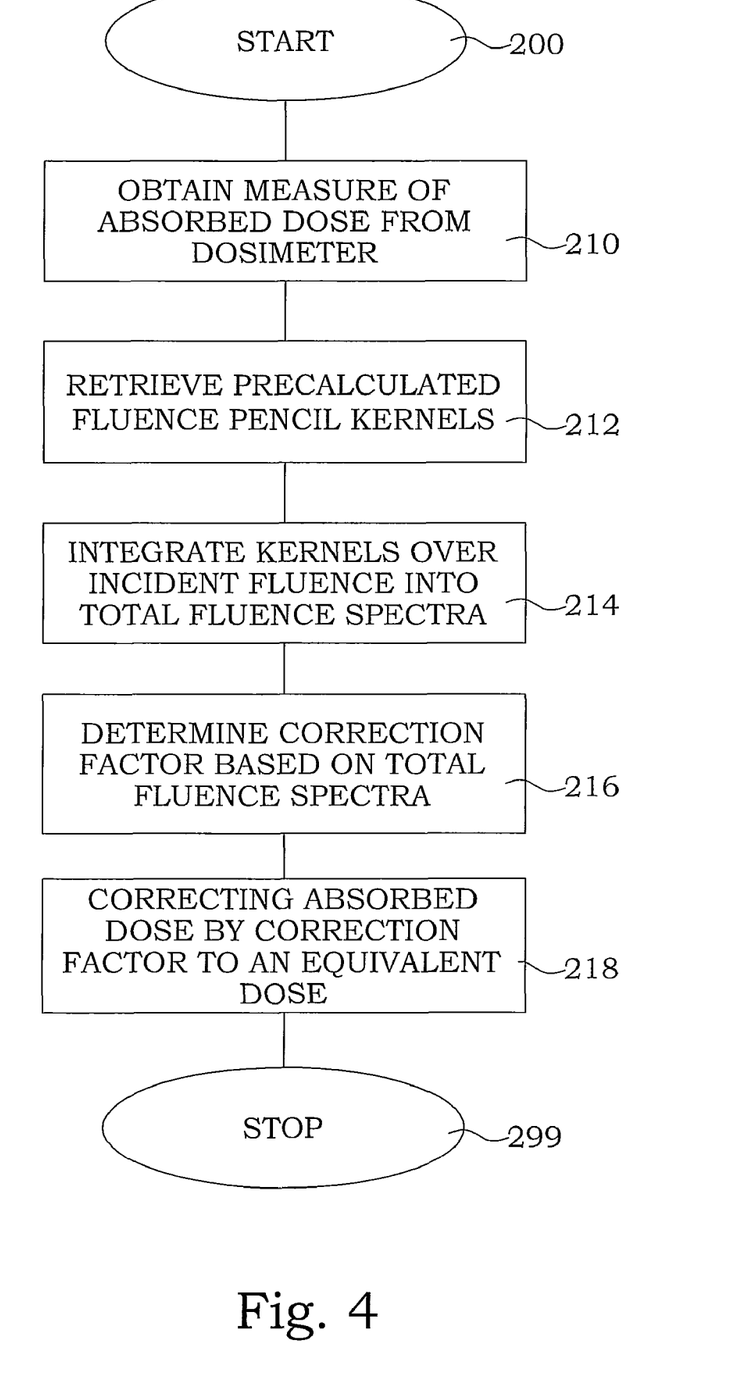
FIG. 4 is a flow diagram of main steps of an embodiment of a method according to the present invention.

A flow diagram of main steps of an embodiment of a method for online detector response correction according to the present invention is shown in FIG. 4. The procedure starts in step 200. A medium is irradiated by an incident fluence of ionization radiation modulated into a fluence distribution over some desired field shape. A measure of the absorbed dose is obtained in step 210 from the dosimeter exposed to the ionizing radiation. In step 212, precalculated fluence pencil kernels are retrieved from a data storage. More precisely, the radiation quality of current interest is selected from a library of, by Monte Carlo Simulation technique, precalculated fluence pencil kernels for different radiation qualities. The precalculated fluence pencil kernels describe fluence response spectra for a point in a medium irradiated by a point monodirectional beam of a specific energy in a surrounding of the beam, per incident amount of radiation. The retrieved precalculated fluence pencil kernel is integrated to match the shape and fluence distribution of the incident radiation field in step 214 giving a total fluence spectrum at the point of the detector. The total fluence spectra comprises fluence spectra for primary radiation as well as fluence spectra for scattered radiation. In one embodiment, the ionizing radiation comprises photons and the total fluence spectra comprises spectra for at least scattered photons and secondary charged particles. In step 216, the correction factor for the material in the detector is calculated from said total fluence spectrum and tabulated material data for the material in the radiation dosimeter. The obtained radiation dosimeter value is corrected into an equivalent dose in step 218. The correction is made by the correction factor into an equivalent dose as if the radiation dosimeter would have been made by a different medium, e.g. the same medium as the surroundings of the radiation dosimeter. The procedure ends in step 299.

An even more detailed description of a presently preferred embodiment is given here below.

In order to fully describe the fluence spectrum, a complete modeling of the particle transport is required. This can be achieved by a Monte Carlo simulation of the coupled electron/positron-photon transport. To simulate the whole volume directly, requires large amount of CPU-time and is impractical for online applications. Instead a differential approach is proposed by the present invention where the Monte Carlo method is used to simulate the fluence from an elemental monodirectional beam, obtaining a so-called fluence pencil kernel. Since the interaction processes in a homogeneous media is invariant to the location, superpositioning of this pencil kernel over a field area, weighted with the modulated incident fluence, gives an accurate description of a clinically relevant broad beam. In such a way, heavy computational tasks, such as calculating the fluence pencil kernels, are performed in advance, and precalculated fluence pencil kernel are stored in a data storage. The much less demanding task of superpositioning can then be performed within such time periods that online correction readily can be obtained.

Fluence Pencil Kernel Model

The principle of superimposing kernels has been used before, but then for dose calculations using energy depositions kernels, see e.g. the document of Ostapiak et al mentioned in the background section. An energy deposition kernel is defined as the distribution of energy imparted to a volume element (per unit mass) in a medium, commonly water, from an elemental beam incident at the origin of the coordinates of the kernel. To achieve a relevant dose measure, the irradiated material has to be known and the properties of the material is used for calculation of the kernels. An integration over the entire volume and over the energy domain thereby gives a total dose for the entire irradiated area. The model used by Ostapiak et al also assumes that secondary radiation effects are neglectable.

Instead of using an energy deposition kernel to directly calculate a dose, a fluence kernel is instead used to calculate a total fluence spectrum according to the present invention. In order to be able to correct a measured absorbed dose of a dosimeter into an equivalent dose tht would have been absorbed by another medium placed at the same place as the dosimeter, absorption differences between different materials have to be estimated. As discussed further below, when radiation reaches a medium, only a part of the direct radiation is absorbed. Another part interacts with the material by different scattering processes giving rise to different kinds of secondary charged particles and/or photon radiation. This secondary radiation can then be absorbed or be scattered again. In order to achieve a measure on absorption differences, the energy and radiation type distribution has to be known in a point of interest.

The geometrical superposition principle is equivalent for fluence pencil kernels, but the kernel instead describes the spectra of the transported particles instead of just their energy deposition. Hence, a fluence pencil kernel can be defined as the fluence spectrum in a volume element, per incident energy, in a semi-infinite medium, typically water, due to a point monodirectional ionizing radiation beam incident at the origin of the kernel. Scoring fluence, instead of dose, enables using the kernel to calculate, not only deposited dose, but also the spectral variations and subsequently correction factors by for different detector materials using the same fluence kernel, but choosing the proper material data. The following description will consider photon beam radiation. However, also other initial ionizing radiations can be treated in an analogous manner, e.g. electron radiation, proton radiation or light ion radiation.

Pencil Kernel Modeling

Figure 5:
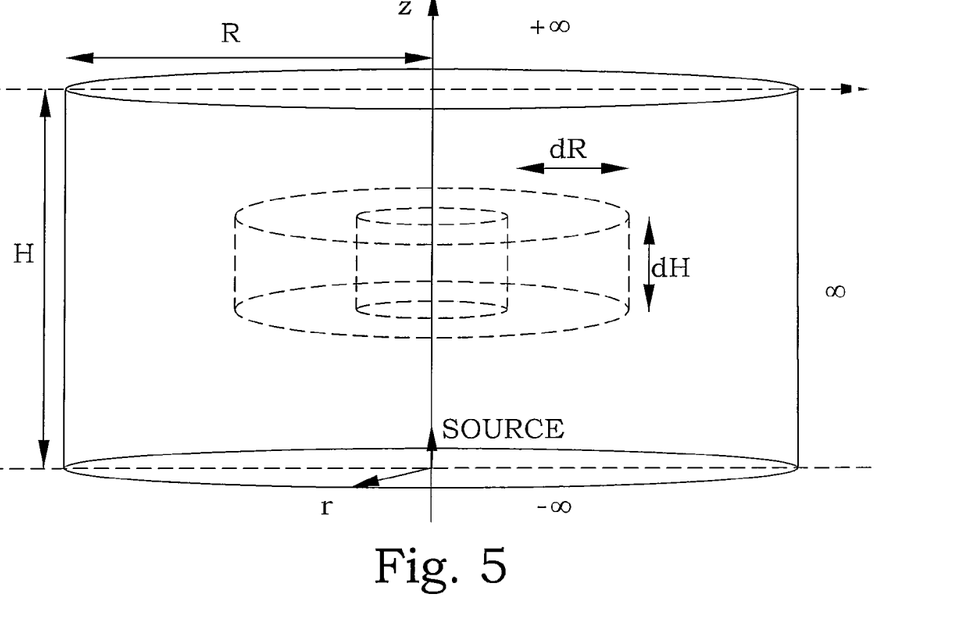
FIG. 5 shows the geometry of scoring the kernel using Monte Carlo simulations of a point monodirectional beam into a slab material.

The pencil kernel modeling is described in particular in connection with FIG. 5. To calculate a fluence pencil kernel the coupled electron/positron-photon transport from a point monodirectional beam is simulated in a slab of material with the Monte Carlo method. The slab has a thickness H and is infinite in its lateral extension. The resulting fluence is scored in cylindrical voxels to utilize the circular symmetry to increase the scoring statistical accuracy. The total scoring volume is a cylinder of radius R and a height H. The cylindrical voxels have a thickness dR and height dH. The center voxel has a diameter equal to dR. The voxels are numbered from the centermost voxel closest to the source and outwards.

The medium surrounding the scoring cylinder is divided into three extra voxels, ±∞ in z-direction and ∞ in r-direction.

The fluence is calculated as the particle tracklength through the voxel divided by the voxel-volume and is differentiated in energy and divided by $n_0 \cdot E_0$, the total energy incident onto the phantom through the point monodirectional beam of energy $E_0$ and number of particles $n_0$, giving the spectrum as the fluence, differentiated in energy per incident energy:

$$\varphi_E(E_0, \vec{r}, z) = \frac{tracklength \text{ of particle per energy } E}{volume} \Big/ n_0 \cdot E_0 \quad (1)$$

Thus, the quantity $\phi_E(E_0, \vec{r}, z)$ express, per amount of radiant energy incident onto the phantom through the point monodirectional beam of energy $E_0$, the fluence at position $\vec{r}, z$ per energy $E$ of the particles.

Integration Technique

Figure 6:
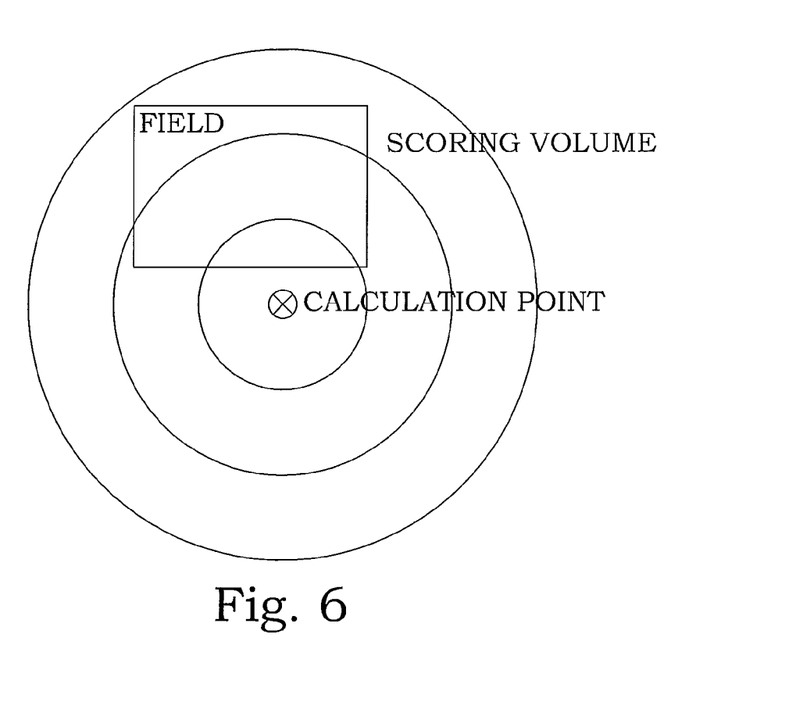
FIG. 6 is a schematic illustration of how a quantity such as fluence at an arbitrary position in an irradiated object for an arbitrary field shape and modulation is calculated using the reciprocity theorem and kernel weights.

By making the approximation that the medium around the kernel is semi-infinite and homogeneous the reciprocity theorem and the superposition principle enables convolution of the fluence pencil kernel by the incident fluence distribution of the radiation field to yield the total fluence at the points of interest. Appropriate weights need to be calculated in order to integrate the fluence pencil kernel to arbitrary shaped and fluence modulated fields. An example is demonstrated in FIG. 6.

Thus the fluence spectrum $\Phi_E$, which enables further calculations, is achieved through the convolution integral of the incident energy fluence spectrum $\psi_{E_0}$ with the fluence pencil kernel $\phi_E(E_0, \vec{r} - \vec{r}', z)$:

$$\Phi_E(\vec{r}, z) = \int_{\substack{\text{Incident} \\ \text{beam spectrum} \\ \text{distribution}}} \int\int \psi_{E_0}(r') \cdot \varphi_E(E_0, \vec{r} - \vec{r}', z) d^2 r' dE_0 \quad (2)$$

It is understood that the convolution (2) is implemented to consider beam geometry specifics as inverse square fluence decrease, in accordance with prior art calculations. The simulation of the fluence pencil kernel tallies the primary (p) and scattered (s) photon-(γ) and electron-(e⁻) fluencies separately. The primary photon fluence being produced by the initial photons from the source and the primary electron fluence by the electrons produced directly in interactions by these primary photons in the medium. All the photons that have interacted at least once in the medium contribute to the scattered photon fluence, and the electrons produced in interactions of these scattered photons contribute to the scattered electron fluence.

Figure 7:
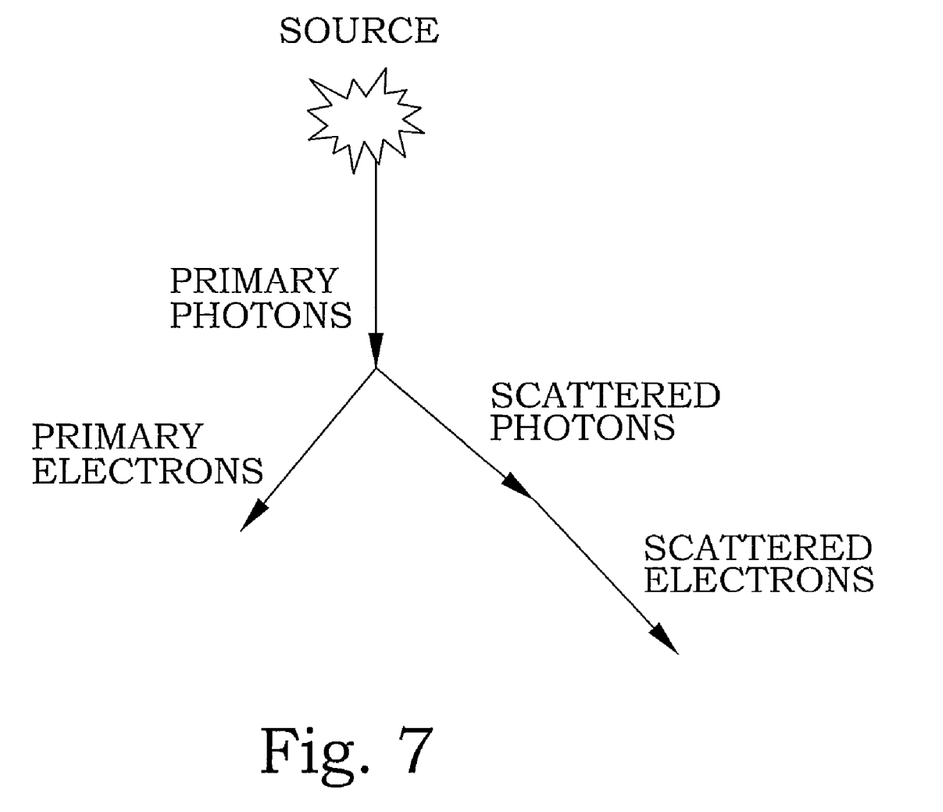
FIG. 7 shows how the fluence is categorized according to interaction history and particle type into primary and scattered, photon and electron fluence.

Hence the total fluence spectrum is divided into the four categories: the primary photon fluence $\Phi_E^{p,\gamma}$, the primary electron fluence $\Phi_E^{p,e^-}$, the scattered photon fluence $\Phi_E^{s,\gamma}$, and the scattered electron fluence $\Phi_E^{s,e^-}$ as illustrated in FIG. 7.

Cavity Theory

Cavity theories relate the dose deposited in a material to the dose deposited in a probe inserted into the material. Cavity theory was developed for ionization chambers where the probe normally is a small gas filled volume. Different theories valid for different cavity sizes have been developed. A cavity's size is related to the characteristic range of the secondary electrons produced inside it. If the range is much larger than the cavity dimension, the cavity is regarded as small and the two Bragg-Gray conditions are fulfilled:

(a) The thickness of the cavity is small enough compared to the range of the incoming radiation so that its particle field is not perturbed by its presence.

(b) The absorbed dose deposited in the cavity can be assumed to come only from particles crossing the cavity and not by particles produced inside the cavity.

Bragg and Gray approximated the dose ratio in this case as:

$$\frac{D_{med}}{D_{cav}} = s_{cav}^{med} \quad (3)$$

where $s_{cav}^{med}$ is the ratio of the mean unrestricted mass-collision stopping powers of a medium to that of the medium in the cavity. The same approach can also be used to convert the dose between different cavity media, e.g. from a detector medium in a plastic phantom medium to a water cavity in the same medium.

Spencer and Attix further developed the theory by setting a limit on the energy of the emitted delta particles through use of restricted mass-collision stopping power, i.e.

$$\frac{D_{med}}{D_{cav}} = s_{\Delta cav}^{med} \quad (4)$$

where $s_{\Delta cav}^{med}$ is the ratio of the mean restricted mass-collision stopping powers of a medium to that of the cavity, and $\Delta$ denote the energy limit corresponding to a particle range of cavity dimension.

To account for energy deposited by electrons with energy less than $\Delta$, a so called Track-End (TE) term is introduced.

$$D_{TE} = \Phi_E^{e^-} S/\rho \Delta \quad (5)$$

where $\Phi_E^{e^-}$ is the particle (electron) fluence spectrum, $S/\rho$ is the unrestricted mass-collision stopping power and $\Delta$ is the cutoff energy.

Hence the dose to the cavity according to the Spencer-Attix theory including the Track-End term is calculated as (by using stopping powers for the medium of interest, cavity or phantom):

$$D = \int_\Delta^{E_{max}} \Phi_E^{e^-} (S_\Delta/\rho) dE + \Phi_\Delta^{e^-}(S/\rho)\Delta \quad (6)$$

If the dose contribution from electrons generated in photon interactions outside the cavity is negligible compared to the contribution from electrons generated in photon interaction inside the cavity, the cavity is considered large, and the Bragg-Gray conditions are not fulfilled. In this case large cavity theory approximates the dose as:

$$D = \int_0^{E_{max}} \Phi_E^\gamma (\mu_{en}/\rho) E dE \quad (7)$$

where $\Phi_E^\gamma$ is the photon fluence spectra, and $\mu_{en}/\rho$ is the mass attenuation coefficient.

Burlin extended the Spencer-Attix theory to cavities of intermediate size by combining it with this large Cavity theory with a mixing factor, α. According to the Burlin theory the absorbed dose is:

$$D = \alpha \left[ \int_\Delta^{E_{max}} \Phi_E^{e^-}(S_\Delta/\rho)dE + \Phi_\Delta^{e^-}(S/\rho)\Delta \right] + \\ (1-\alpha)\int_0^{E_{max}} \Phi_E^\gamma (\mu_{en}/\rho)EdE \quad (8)$$

where $\Phi_E^{e^-}$ is the electron fluence spectrum, $S_\Delta/\rho$ is the restricted mass-collision stopping power, $\Delta$ the cutoff energy above which energy deposition of secondary electrons is excluded, $\Phi_\Delta^{e^-}$ is the electron fluence spectrum evaluated at the energy $\Delta$, $S/\rho$ is the unrestricted mass-collision stopping power at same energy, $\Phi_E^\gamma$ the photon fluence spectrum and $\mu_{en}/\rho$ is the mass attenuation coefficient, E is the photon energy.

Yin el al suggested that, for megavoltage photon beams, the contributions can be separated into not only photons and electrons, but also into primary and scattered photons and electrons, introducing a second mixing coefficient, β into the Burlin theory:

$$D = \alpha \left[ \int_\Delta^{E_{max}} \Phi_E^{p,e^-}(S_\Delta/\rho)dE + \varphi_\Delta^{p,e^-}(S/\rho)\Delta \right] + \\ (1-\alpha)\int_0^{E_{max}} \Phi_E^{p,\gamma}(\mu_{en}/\rho)EdE + \\ \beta \left[ \int_\Delta^{E_{max}} \Phi_E^{s,e^-}(S_\Delta/\rho)dE + \Phi_\Delta^{s,e^-}(S/\rho)\Delta \right] + \\ (1-\beta)\int_0^{E_{max}} \Phi_E^{s,\gamma}(\mu_{en}/\rho)EdE \quad (9)$$

where $\Phi_E^{p,\gamma}$, $\Phi_E^{p,e^-}$, $\Phi_E^{s,\gamma}$, and $\Phi_E^{s,e^-}$ is the primary photon, primary electron, scatter photon and scatter electron fluence respectively.

Assuming that the primary radiation fulfills the Bragg-Gray conditions (i.e. meets with small cavity theory) and the scattered radiation meets with large cavity theory, the coefficients are chosen as α=1, β=0, resulting in (by using stopping powers for the medium of interest, cavity or phantom according eq. 3 and 4.):

$$D = \int_\Delta^{E_{max}} \Phi_E^{p,e^-}(S_\Delta/\rho)dE + \Phi_\Delta^{p,e^-}(S/\rho)\Delta + \int_0^{E_{max}} \Phi_E^{s,\gamma}(\mu_{en}/\rho)EdE \quad (10)$$

The fluence spectrum from fluence pencil kernels superpositions can be inserted into this theory and correction factors can thus be calculated. The fluence spectrum is differentiated in particle type and primary and scattered particles in the Monte Carlo simulation.

Correction Factors

Correction factors relate the signal measured with a dosimeter to the absorbed dose into the material the detector is probing. This will depend on the dosimeter and the beam quality. The latest dosimetry protocol, the IAEA TRS-398 from 2001, is the current Code of Practice for dosimetric calculations for absolute dosimetry. The absolute absorbed dose, $D_{w,Q}$, from a high energy photon sources with beam quality Q under reference conditions in water is given as:

$$D_{w,Q} = M_Q N_{D,w,Q_0} k_{Q,Q_0} \quad (11)$$

where $M_Q$ is the reading from the dosimeter, $N_{D,W,Q_0}$ the calibration factor of the dosimeter in water for the beam reference quality, $Q_0$, and $k_{Q,Q_0}$ is the chamber-specific factor to correlate the difference between the reference beam $Q_0$ and the actual quality, Q being used. In the report, $k_{Q,Q_0}$ is tabulated for different chamber types and beam qualities (specified by the $TPR_{20/10}$).

In relative dosimetry, ratios of absorbed dose from different conditions are determined. Hence $N_{D,w,Q_0}$ becomes irrelevant and the correction factors will also be on the form of ratios.

In the fluence pencil kernel model, correction factors are obtained from the simulated fluence pencil kernels by assuming that the fluence spectra incident onto a detector-volume will be the same as the calculated fluence spectra onto a corresponding volume in water. The correction factors can then be calculated directly for different detector materials using equation (10).

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

O. Z. Ostapiak, Y. Zhu and J. van Dyk, "Refinements of the finite-size pencil beam model of three-dimensional photon dose calculation", Med. Phys. 24(5), May 1997, pp. 743-750.

A. Ahnesjö, M. Aspradakis, "Dose Calculation for External Photon Beams in Radiotherapy", Phys. Med. Biol. 44, pp. 99-155, 1999.

Z. Yin, R P Hugtenburg, A H Beddoe, "Response Corrections for Solid-State Detectors in Megavoltage Photon Dosimetry", Phys. Med. Biol. 49, pp. 3691-3702, 2004.

F. H. Attix, Introduction to Radiological Physics and Radiation Dosimetry, Wiley, New York 1986, pp. 231-263.

IAEA, "Absorbed Dose Determination in External Beam Radiotherapy: An International Code of Practice for Dosimetry based on Standards of Absorbed Dose to Water", TRS-398, 2001, pp. 59-71

The invention claimed is:

1. Method for detector response correction, comprising the steps of:
    obtaining a measure of an absorbed dose from a radiation dosimeter exposed to an ionizing radiation;
    retrieving precalculated fluence pencil kernels from a data storage;
    said precalculated fluence pencil kernels describe fluence response spectra for a point in a medium irradiated by a point monodirectional beam of a specific energy in a surrounding of said beam, per incident amount of radiation;
    integrating said retrieved precalculated fluence pencil kernels over an incident fluence of said ionizing radiation into a total fluence spectra;
    said total fluence spectra comprising fluence spectra for primary radiation as well as fluence spectra for scattered radiation;
    determining a correction factor for said radiation dosimeter based on a local said total fluence spectra at said point and a medium of said radiation dosimeter; and correcting said measure of said absorbed dose by said correction factor into an equivalent dose as if said radiation dosimeter would have been made by a different medium.

2. Method according to claim 1, wherein said precalculated fluence pencil kernels are obtained from Monte Carlo simulations.

3. Method according to claim 2, wherein said precalculated fluence pencil kernels are scored in cylindrical voxels.

4. Method according to claim 1, wherein said step of determining said correction factors are based on Cavity theory.

5. Method according to claim 1, wherein said step of retrieving retrieves precalculated fluence pencil kernels obtained for energies and particle types used in said ionizing radiation.

6. Method according to claim 1, wherein said step of retrieving retrieves precalculated fluence pencil kernels obtained for said surrounding medium.

7. Method according to claim 1, wherein said total fluence spectra comprises fluence spectra for a particular field shape and fluence distribution of said ionizing radiation and for a particular position in space relative to said field shape.

8. Method according to claim 1, wherein said ionizing radiation comprises at least one of:
    photons;
    electrons;
    protons; and
    light ions.

9. Method according to claim 1, wherein said ionizing radiation comprises photons and said total fluence spectra comprises spectra for at least scattered photons and secondary charged particles.

10. Method according to claim 1, wherein said method is performed in vitro.

11. Method according to claim 1, wherein said different medium is the same medium as the surroundings of said radiation dosimeter.

12. Arrangement for detector response correction, comprising:
    input means for obtaining a measure of an absorbed dose from a radiation dosimeter exposed to an ionizing radiation;
    data storage arranged for storing precalculated fluence pencil kernels;
    said precalculated fluence pencil kernels describe fluence response spectra for a point in a medium irradiated by a point monodirectional beam of a specific energy in a surrounding of said beam, per incident amount of radiation;
    processor means arranged for retrieving said precalculated fluence pencil kernels;
    said processor means being further arranged for integrating said retrieved precalculated fluence pencil kernels over an incident fluence of said ionizing radiation into a total fluence spectra;
    said total fluence spectra comprising fluence spectra for primary radiation as well as fluence spectra for scattered radiation;
    said processor means being further arranged for determining a correction factor for said radiation dosimeter based on a local said total fluence spectra at said point and a medium of said radiation dosimeter;
    said processor means being further arranged for correcting said measure of said absorbed dose by said correction factor into an equivalent absorbed dose as if said radiation dosimeter would have been made by a different medium; and
    output means for presenting said equivalent absorbed dose.

13. Arrangement according to claim 12, wherein said processor determines said correction factors utilizing Cavity theory.

14. Arrangement according to claim 12, wherein said processor means being arranged for retrieving precalculated fluence pencil kernels obtained for energies and particle types used in said ionizing radiation.

15. Arrangement according to claim 12, wherein said processor means being arranged for retrieving precalculated fluence pencil kernels obtained for said surrounding medium.

16. Arrangement according to claim 12, wherein said total fluence spectra comprises fluence spectra for a particular field shape of said ionizing radiation and for a particular position in space relative to said field shape.

17. Arrangement according to claim 12, wherein said ionizing radiation comprises photons and said total fluence spectra comprises spectra for at least scattered photons and secondary charged particles.

18. Arrangement according to claim 12, wherein said different medium is the same medium as the surroundings of said radiation dosimeter.

19. Irradiation device, comprising:
    a radiation dosimeter;
    a radiation source arranged for exposing said radiation dosimeter to ionizing radiation; and
    an arrangement for detector response correction;
    said arrangement for detector response correction in turn comprising:
    input means for obtaining a measure of an absorbed dose from a radiation dosimeter exposed to an ionizing radiation;
    data storage arranged for storing precalculated fluence pencil kernels;
    said precalculated fluence pencil kernels describe fluence response spectra for a point in a medium irradiated by a point monodirectional beam of a specific energy in a surrounding of said beam, per incident amount of radiation;
    processor means arranged for retrieving said precalculated fluence pencil kernels;
    said processor means being further arranged for integrating said retrieved precalculated fluence pencil kernels over an incident fluence of said ionizing radiation into a total fluence spectra;
    said total fluence spectra comprising fluence spectra for primary radiation as well as fluence spectra for scattered radiation;
    said processor means being further arranged for determining a correction factor for said radiation dosimeter based on a local said total fluence spectra at said point and a medium of said radiation dosimeter;
    said processor means being further arranged for correcting said measure of said absorbed dose by said correction factor into an equivalent absorbed dose as if said radiation dosimeter would have been made by a different medium; and output means for presenting said equivalent absorbed dose.

20. Irradiation device according to claim 19, wherein said radiation dosimeter is selected from the list of:
- ionization chamber;
- solid state detector;
- diode;
- photographic film; and
- thermoluminescence detector.

21. Irradiation device according to claim 19, wherein said radiation source is selected from the list of:
- photon radiation source;
- electron radiation source;
- proton radiation source; and
- light ion radiation source.

* * * * *